Aug. 17, 1954  J. C. VOGEL ET AL  2,686,593

PRODUCTION AND USE OF STABILIZED SUSPENSIONS IN WATER

Filed Sept. 8, 1949

INVENTOR
JOHANN CHRISTIAN VOGEL &
WILLIAM ARTHUR HAHN

BY

ATTORNEY

Patented Aug. 17, 1954

2,686,593

UNITED STATES PATENT OFFICE 2,686,593

PRODUCTION AND USE OF STABILIZED SUSPENSIONS IN WATER

Johann Christian Vogel and William Arthur Hahn, Pretoria, Transvaal, Union of South Africa Application September 8, 1949, Serial No. 114,602

17 Claims. (Cl. 209—172.5)

Suspensions of solids in water are already known, in which the rate of settling of the solids is retarded by the presence of stabilising agents. The known suspensions are often not sufficiently stable, so that stirring or agitation must be employed to prevent settling, and often a desired high concentration of the solids and high specific gravity of the suspension cannot be attained.

Again, it is known in the mining industry to convey solids, such as sand or ores in aqueous suspension, stabilised by an addition of clay, by means of gravity flow, by air lift or by pumping. The stability of such suspensions often leaves room for improvement in practice, and in consequence they usually flow freely only when a considerable fall is provided or considerable pumping energy is expended.

We have now found that suspensions in water or other aqueous media of comminuted solids can be produced with improved stability, by providing for the presence therein of a stabilising agent comprising one or more insoluble or slightly soluble flocculent compounds obtained by interaction of a basic oxide or hydroxide of a metal with an amphoteric oxide or hydroxide or with a weak acid of the type of silicic acid, the reaction components being introduced as such or in the form of their salts, and the interaction being carried out in water in which a basic reaction is maintained.

Examples of solids, which may be suspended in accordance with the present invention, are magnetite, hematite, or sulphide ores or other metal ores, such as galena or pyrites, or minerals, such as corundum, barytes or shale, or siliceous materials, such as sand, gold sands or dolerite, or artificial products, such as roasted ores, metal oxides or carbides, silicon carbide, mill scale, crushed brick, cast iron, ferro-silicon or other ferrous alloys. The said solids usually have a specific gravity of at least 2.5 and preferably at least 4. Mixtures of such solids may also be suspended in the same medium.

The stability of suspensions of like composition, prepared in accordance with the present invention, increases with decreasing particle size, increases with increasing proportion of suspended solid to aqueous medium and increases with increasing proportion of stabiliser to suspended solid.

The solids to be suspended must be of convenient particle size and, if not sufficiently small, must be comminuted by suitable means, such as grinding, crushing or chemical precipitation. Thus suspensions of a high degree of stability have been obtained with samples of dolerite of a grain size of 2 millimetres to 0.1 millimetre, 1 millimetre to 0 millimetre and 0.1 millimetre to 0 millimetre. Sand of similar grain sizes forms equally stable suspensions. Very stable suspensions have also been prepared from magnetite and hematite of a grain size of 0.1 to 0 millimetre and also from ferro-silicon of a grain size of 0.1 to 0 millimetre.

The proportion of solid to aqueous medium to be be employed depends on the specific gravity, viscosity and stability of the suspension desired for any specific purpose. Useful suspensions are usually obtainable employing between about 15 and 50 parts by volume, and preferably between about 20 and 40 parts by volume, of suspended solid to 100 parts of water.

Below the said range, the suspensions usually settle rather rapidly leaving a clear aqueous layer. This may serve in practice for concentrating suspensions, which have become diluted in use. Above the said range, the suspensions are usually very viscous, and may have a pasty consistency.

The above volume relationship gives a rough indication of the apparent specific gravities of suspensions of suitable viscosity obtainable with solids of different specific gravities.

The specific gravities of suspensions, in accordance with the present invention, vary within a wide range, say between above 1 and 3.4 or more dependent on the specific gravity of the solid and the proportions thereof in suspension.

The specific gravity of a suspension, in accordance with the present invention, may be maintained at a substantially constant value, may be raised or may be lowered by adding either periodically or continuously in the required proportions either water or comminuted solid or both. The solid added may be the same as or different from the solid originally used to prepare the suspension.

The stabilising agents preferably employed in accordance with the present invention, are flocculent metal metallates of the oxides or hydroxides of the divalent metals, such as calcium or magnesium, e. g. an alkaline earth metal having an atomic number up to 20, with amphoteric oxides, amphoteric hydroxides or water soluble salts of trivalent metals having an atomic number between 13 and 26, e. g. of trivalent iron or chromium or of aluminum, e. g. flocculent calcium or magnesium aluminate or calcium or magnesium chromite or mixtures of such compounds. The silicates of calcium or magnesium or of trivalent or divalent iron may also be employed. These compounds are employed in the flocculent form and prepared as herein specified.

The stabilising effect may be achieved by adding the stabilising agent in flocculent form to the water or aqueous medium serving as the suspension medium, or by forming the stabilising agent in the water or aqueous medium either before or after the addition of the solid to be suspended.

The stabilising agent may be prepared by adding the basic oxide or hydroxide, either in the form of a solution or in the solid form, to a solution of a salt of the amphoteric oxide or of the weak acid or it may be formed by adding an alkali to a solution containing a salt of the basic oxide or hydroxide and a salt of the amphoteric oxide or of the weak acid.

The preparation of a suspension may be conveniently performed by dissolving a salt of the weak acid, such as sodium silicate or a salt of the amphoteric oxide, such as aluminium sulphate or alum or ferric chloride or ferric ammonium alum or chrome alum in water or in aqueous media, then adding the comminuted solid to be suspended and thereon adding a basic oxide, such as calcium oxide or magnesium oxide or a basic hydroxide, such as calcium or magnesium hydroxide and then agitating the whole.

The suspension may also be prepared by dissolving a salt of the weak acid or of the amphoteric oxide together with a salt of the basic oxide, such as calcium chloride or magnesium chloride or sulphate in water or an aqueous medium, then adding an alkali, such as sodium hydroxide, thereon adding the comminuted solid to be suspended and then agitating the whole.

The suspension may also be prepared by mixing the water or aqueous medium with the solid to be suspended and then adding the salt of the weak acid or amphoteric oxide and the basic oxide or hydroxide and agitating the whole.

It is essential for the formation of the stabilising agents and the maintenance of their efficiency in the suspension or in storage, that a sufficient degree of basicity or alkalinity be maintained in the reaction medium or in the suspension. The required alkalinity or basicity varies from compound to compound and depends on the concentration of the various components. A reasonable excess of alkali or base is usually not detrimental and often desirable.

The aforementioned reactions for the formation of the stabiliser frequently take some time for their completion, and also time must usually be allowed for the stabilising agent to stabilise the suspension. Heating may serve to accelerate the said processes.

The aqueous medium of the suspension may contain salts in solution, for example, those resulting from the formation of the stabilising agent.

The proportions of stabilising agents provided in the suspensions in accordance with the present invention, depend on the nature of the material to be suspended, its fineness, the proportion of suspended solid to water and the degree of stability and viscosity desired. The said proportions are usually small, for example, calculated as water-free compounds, of the order of a fraction of 1 per cent, say from about 0.5 per cent or 1 per cent or a few per cent, say up to about 5 per cent, as the case may be, but more or less may be employed, if desired.

A suspension with a high degree of stability is, for example, obtained with about 1 part by weight of ferric chloride, or 2 parts by weight of crystalline aluminum sulphate, 2 parts by weight of calcium hydroxide, 100 parts by weight of magnetite of a maximum grain size of 0.1 millimetre and 100 parts by weight of water.

Suspensions prepared as herein specified, require, by reason of their greater stability, less stirring or agitation to maintain a substantially uniform distribution of the solid in suspension, and a substantially uniform average density of the suspension, than do suspensions prepared without the said stabilising agent. Stirring or agitation can often be practically dispensed with.

*Demonstration of the efficiency of the stabilising agent in accordance with the present invention*

Four suspensions in water of magnetite ground to pass a sieve with 0.107 millimetre openings were made. The proportions by weight of the ingredients used to make the suspensions are shown in the following table:

| Suspension No. | Composition |
| --- | --- |
| I | 120 parts magnetite. 100 parts water. |
| II | 120 parts magnetite. 100 parts water. 2 parts clay. |
| III | 120 parts Magnetite. 100 parts water. 4 parts clay. |
| IV | 120 parts magnetite. 100 parts water. 1 part crystalline ferric chloride. 2 parts slaked lime. |

Suspension I is unstabilised, suspensions II and III are stabilised with clay and suspension IV is stabilised in accordance with the present invention and contains 0.6 part of undissolved flocculent stabilising agent, calculated as dry substance. The pH values of the suspensions I, II and III are 8.0 and that of the suspension IV is 11.6.

The suspensions were placed in tall cylinders, agitated until uniform and allowed to stand without further agitation. The specific gravities of the various suspensions were measured with hydrometer spindles, after having stood for the time intervals indicated in the following table. The spindles were immersed to the extent of two-thirds of the depth of the suspension in the cylinders.

The specific gravities measured in each of the suspensions after standing for the indicated period of time are also recorded in the following table:

| Suspension No. | Specific gravity | | | |
| --- | --- | --- | --- | --- |
|  | I | II | III | IV |
| Time of standing: | | | | |
| 5 secs | 1.59 | 1.68 | 1.72 | 1.78 |
| 30 secs | 1.40 | 1.60 |  | 1.77 |
| 1 min | 1.30 | 1.53 | 1.65 | 1.77 |
| 2 min | 1.18 | 1.39 | 1.59 | 1.76 |
| 5 min |  | 1.18 | 1.42 | 1.75 |
| 10 min |  |  | 1.19 | 1.73 |
| 15 min |  |  |  | 1.71 |

The table shows that suspension IV, prepared in accordance with the present invention, settles much less rapidly than do the other three suspensions, and that the stabilising agent in suspension IV is more effective than six times its weight of clay.

*Demonstration of the efficacy of the stabilising agent, in accordance with the present invention, in maintaining a suspension in fluid form*

Three suspensions in water of gold-bearing sand, which had been ground to pass a sieve having 0.64 millimetre openings, and which contained 45 per cent which was retained on a sieve having 0.32 millimetre openings and 10 per cent which passed a sieve having 0.107 millimetre openings, were made. The parts by weight of the ingredients used to make up the suspensions are shown in the following table:

| Suspension No. | Composition |
|---|---|
| V | 100 parts sand.<br>100 parts water. |
| VI | 100 parts sand.<br>100 parts water.<br>5 parts clay. |
| VII | 100 parts sand.<br>100 parts water.<br>3 parts cryst. aluminium sulphate.<br>2 parts slaked lime. |

Suspensions V and VI are in accordance with the prior art, whereas suspension VII is in accordance with the present invention and contains less than 1 part of undissolved stabilising agent calculated as the weight of dry substance.

The suspensions were thoroughly agitated and then allowed to stand undisturbed for four hours. The suspensions settled out as follows:

Suspension V separated into—

(a) 66 parts by weight of clear water.
(b) 134 parts by weight of a consilidated sand, which would not flow and which contained 25 per cent of water by weight.

Suspension VI separated into—

(a) 40 parts by weight of clear water.
(b) 48 parts by weight of a suspension of clay and fine sand, which was fluid and which contained 73 per cent by weight of water.
(c) 117 parts of weight of a consolidated sand, which would not flow and which contained 21 per cent by weight of water.

Suspension VII separated into—

(a) 25 parts by weight of clear water.
(b) 177 parts by weight of a homogeneous fluid suspension which contained 42 per cent by weight of water.

In suspension V, which was prepared without a stabilising agent, the separation of clear water from sand was the greatest. In suspension VI, in which clay was the stabilising agent, a separation occurred into a layer of clear water, a second layer containing most of the clay and a third layer of sand. In suspension VII, which was prepared in accordance with the present invention, only two layers could be distinguished, a layer of clear water and a layer containing the sand and the stabilising agent intimately mixed and containing much more water than the sand layers in suspensions V and VI. The sandy layers in the suspensions prepared without stabilising agent and with clay as a stabilising agent were consolidated and could no longer be pumped, whereas the sandy layer in the suspension, prepared in accordance with the present invention, was still fluid after standing for four hours, and was still capable of being pumped, although this suspension contained less than one fifth as much stabilising agent as the suspension stabilised with clay.

*Demonstration of the effect of particle size and of the proportion of suspended solid to aqueous medium on the stability of suspensions, prepared in accordance with the present invention*

Four suspensions if a naturally occurring sand were made, and a further portion of the same sand was washed to remove a portion of the finer particles and three suspensions were made from the washed product. Six suspensions of finely ground magnetic iron ore were also prepared. The sieve analyses in the following table show the particle size distribution in these solids.

| Percentage by weight retained on a sieve having— | Natural sand | Washed sand | Magnetic iron ore |
|---|---|---|---|
| 0.21 millimetre openings | 0 | 0 | 0 |
| 0.107 millimetre openings | 44 | 56 | 13 |
| 0.063 millimetre openings | 71 | 80 | 50 |

The suspensions were made by agitating the solid with water, with and without the addition of stabilising agent. Where stabilising agent was used, the suspensions were made by dissolving 2 parts by weight of crystalline aluminium sulphate for each 100 parts by weight of solid in the required quantity of water, adding the solid to the solution and then adding sufficient slaked lime to saturate the solution therewith and thoroughly agitating the whole.

The specific gravities of the suspensions were measured and they were then poured to a depth of 30 centimetres into tall cylinders and allowed to stand without further agitation. After the lapse of various periods of time, the average specific gravity of that portion of each suspension between 3 centimetres and 7 centimetres from the surface was measured.

The parts by weight of water and of crystalline aluminium sulphate per 100 parts by weight of suspended solid in each suspension, and the specific gravity of the upper layer after standing for the indicated period of time are recorded in the following tables.

| Suspension No. | VIII | IX | X | XI | XII | XIII | XIV |
|---|---|---|---|---|---|---|---|
| Suspended solid | (1) | (1) | (1) | (1) | (2) | (2) | (2) |
| Parts of water | 125 | 125 | 205 | 225 | 100 | 125 | 150 |
| Parts of aluminium sulphate | 0 | 2 | 2 | 2 | 2 | 2 | 2 |
| *Specific gravity* | | | | | | | |
| Time of standing: | | | | | | | |
| 0 sec | 1.33 | 1.39 | 1.26 | 1.24 | 1.46 | 1.39 | 1.34 |
| 30 secs | 1.21 | ---- | 1.26 | 1.23 | ---- | 1.39 | 1.34 |
| 1 min | 1.09 | ---- | 1.25 | 1.19 | ---- | 1.38 | 1.33 |
| 2 min | 1.02 | ---- | 1.24 | 1.14 | ---- | 1.35 | 1.31 |
| 3 min | ---- | 1.39 | 1.23 | 1.10 | ---- | 1.34 | 1.29 |
| 5 min | ---- | 1.39 | 1.22 | 1.07 | 1.46 | 1.32 | 1.24 |
| 10 min | ---- | 1.39 | 1.21 | 1.06 | 1.45 | 1.24 | 1.14 |

[1] Natural sand.
[2] Washed sand.

| Suspension No. | XV | XVI | XVII | XIX | XX | XXI |
|---|---|---|---|---|---|---|
| Suspended solid | (1) | (1) | (1) | (1) | (1) | (1) |
| Parts of water | 67 | 67 | 78 | 78 | 100 | 100 |
| Parts of aluminium sulphate | 0 | 2 | 0 | 2 | 0 | 2 |
| *Specific gravity* | | | | | | |
| Time of standing: | | | | | | |
| 0 sec | 1.85 | 1.85 | 1.75 | 1.76 | 1.61 | 1.62 |
| 30 secs | 1.76 | ---- | 1.60 | 1.76 | 1.34 | 1.62 |
| 1 min | 1.59 | ---- | 1.41 | 1.75 | 1.24 | 1.61 |
| 2 min | 1.39 | ---- | 1.30 | 1.74 | 1.19 | 1.56 |
| 5 min | ---- | 1.85 | ---- | 1.71 | ---- | 1.51 |

[1] Magnetic iron ore.

The table shows, that the suspensions VIII, XV, XVII and XX made without stabilising agent settle out more rapidly than the corresponding suspensions IX, XVI, XIX and XXI prepared with stabilising agent, in accordance with the present invention. A comparison of suspensions IX, X, and XI, XII, XIII, and XVI, XIX and XXI shows that the rate of settling of a stabilised suspension increases with increasing dilution. This property may be employed for concentrating suspensions which have become dilute. A comparison of suspensions IX, X, and XI with XII, XIII, and XIV shows that the same amount of stabilising agent is more effective in reducing the rate of settling of the finer natural sand than the coarser washed sand.

*Demonstration of the homogeneity of suspensions of fine powder, prepared in accordance with the present invention, and of their rate of settling*

Four suspensions were made with finely ground barytes, which passed completely through a sieve having 0.063 millimetre openings. Two of the suspensions were made by agitating the solid with water alone, and two were made by agitating the solid with water in which 2 parts by weight of crystalline aluminium sulphate for every 100 parts by weight of barytes had been dissolved, then adding slaked lime in a quantity sufficient to saturate the solution and again agitating the whole. The specific gravity of each suspension was measured and they were then poured into tall cylinders to a depth of 30 centimetres and allowed to stand without agitation. After the lapse of various periods of time, the depth of clear water which had formed above each suspension was measured. The average specific gravity of the 5 centimetres of suspension immediately beneath the clear water layer, of the suspension between 9 centimetres and 5 centimetres from the bottom of the cylinder, of the suspension between 1 centimetre and 5 centimetres from the bottom of the cylinder, and the average specific gravity of the whole suspension, excluding only the clear layer were measured in each suspension after the lapse of various periods of time. The measurements made are shown in the following table.

| Suspension No. | XXII | XXIII | XXIV | XXV |
| --- | --- | --- | --- | --- |
| Parts barytes | 200 | 300 | 400 | 400 |
| Parts water | 250 | 250 | 550 | 550 |
| Parts aluminium sulphate | 0 | 6 | 0 | 8 |
| Specific gravity | 1.69 | 1.69 | 1.46 | 1.46 |
| After standing for 15 minutes: | | | | |
| Centimetres of clear water | 1.7 | 0.3 | 4.0 | 1.9 |
| specific gravity, top layer | 1.69 | 1.70 | 1.45 | 1.44 |
| specific gravity, 5-9 cms from bottom | 1.69 | 1.70 | 1.49 | 1.46 |
| specific gravity, 1-5 cms. from bottom | 1.82 | 1.73 | 1.76 | 1.60 |
| Average specific gravity excluding water layer | 1.74 | 1.70 | 1.52 | 1.49 |
| After standing for 30 minutes: | | | | |
| Centimetres of clear water | 3.2 | 1.1 | 7.2 | 3.5 |
| specific gravity, top layer | 1.69 | 1.70 | 1.42 | 1.44 |
| specific gravity, 5-9 cms. from bottom | 1.69 | 1.72 | 1.53 | 1.49 |
| specific gravity, 1-5 cms. from bottom | 2.10 | 1.80 | 2.20 | 1.80 |
| Average specific gravity excluding water layer | 1.77 | 1.72 | 1.62 | 1.51 |
| After standing for 60 minutes: | | | | |
| Centimetres of clear water | 5.7 | 2.9 | 13.5 | 6.8 |
| After standing for 40 hours: | | | | |
| Centimetres of clear water | 14.7 | 7.4 | 19.6 | 14.0 |

The table shows that suspensions, stabilised in accordance with the present invention, settle more slowly than similar unstabilised suspensions, and that the difference in the specific gravities in the uppermost and lowermost layers of the stabilised after standing is much less than in the case of unstabilised suspensions.

*Demonstration of the effect of the proportion of stabiliser to suspended solid on the degree of stability achieved in a suspension and on the viscosity of the suspension*

Three suspensions of magnetic iron ore which had been ground to pass completely through a sieve having 0.21 millimetre openings, were made in accordance with the present invention. Each suspension contained equal parts by weight of water and suspended solids. Varying amounts of crystalline aluminium sulphate were dissolved in each. The three suspensions were then saturated with slaked lime, heated to 50 degrees centigrade, cooled to 20 degrees centigrade and thoroughly agitated. The relative viscosities of the suspensions were measured by measuring the time taken for 100 millilitres of the suspension to flow out of a container through a tube 15 millimetres long and 3 millimetres in diameter and dividing by the time taken for the same volume of water to flow under the same conditions. The freshly agitated suspensions were poured into tall cylinders to a depth of 29 centimetres and allowed to stand without further agitation. The average specific gravities of that portion of each suspension between 3 and 7 centimetres below the surface were measured after various periods of time.

The parts by weight of aluminium sulphate per 100 parts by weight of magnetic iron ore used to stabilise the suspension, the relative viscosity and the density of the upper layer after standing for the stated period of time are recorded in the following table.

| Suspension No. | XXVI | XXVII | XXVIII |
| --- | --- | --- | --- |
| Parts of aluminum sulpahte | 1 | 2 | 4 |
| Relative viscosity | 1.06 | 1.08 | 1.13 |
| Time of standing: | | | |
| 0 min | 1.61 | 1.61 | 1.61 |
| 1 min | 1.61 | | |
| 2 min | 1.59 | | |
| 3 min | 1.51 | | |
| 5 min | 1.48 | | |
| 10 min | 1.26 | 1.61 | 1.61 |

The table shows, that the relative viscosity of a suspension, prepared in accordance with the present invention increases with increasing proportions of stabilising agent, and that with increasing proportions of stabilising agent the rate of settling in the upper layers of the suspension decreases.

Suspensions, prepared in accordance with the present invention, may be utilised in various ways.

Thus they are of particular advantage for the gravity separation of materials consisting of discrete particles of different specific gravity with the aid of separating media, consisting of suspensions of comminuted solids in water or other aqueous media.

Numerous suspensions of solids in water have already been proposed or employed as separating media in processes of the said type. Most of the known separating processes are attended with some disadvantage or other.

Thus in many cases, in order to maintain the solids in suspension in the separating media, these must be circulated through the separator or otherwise stirred or agitated. Such circulation becomes the more necessary, the higher is the specific gravity of the solid to be suspended, but such agitation often has an adverse effect on the separation proper, since it tends to retard the demixing of the materials to be separated, in particular, if the difference in specific gravity between them and the separating media are not very considerable.

Furthermore, suspensions of barytes in water have been employed for the gravity separation of coal from undesired material. In this case, large amounts of clay are often employed to stabilise the suspension, for example, 2 parts of clay to 1 part of barytes. These suspensions require little or no agitation to maintain them, but the large proportion of clay undesirably increases the viscosity of the separating fluid, and limits the maximum proportion of barytes to water and thus the maximum specific gravity of the separating fluid which can be employed.

Aqueous solutions of salts or dense organic liquids or melts have also been employed as separating media in gravity separation processes, but, as a rule, these are not very economical, because, while having the advantage that they need not be substantially agitated, they are rather costly and their regeneration is expensive.

Moreover, it is often difficult to attain or maintain a sufficiently high specific gravity of the separating media for many practical purposes.

We have now found that marked improvements are obtained in the gravity separation of materials consisting of discrete particles of substantially different specific gravities, by subjecting them to a float and sink treatment with a separating medium of an apparent specific gravity intermediate between those of the components to be separated, comprising suspensions of comminuted solids in water or other aqueous media, the stability of which suspensions is improved by the presence therein of a stabilising agent, comprising one or more insoluble or slightly soluble flocculent compounds obtained as herein specified.

Examples of specific gravities attainable in suspensions made up with various types of solids, in accordance with the present invention, and which may be employed as separating media, are:

1. Sand suspended in water. The sand may have, for example, a maximum grain size of 1 millimetre and contain, for example, 45 per cent of grains between 1 millimetre and 0.3 millimetre, 30 per cent of grains between 0.3 millimetre and 0.2 millimetre, 15 per cent of grains between 0.2 and 0.1 millimetre and 5 per cent of grains of less than 0.06 millimetre. From this, separating media can be prepared with an apparent specific gravity of up to about 1.7.

2. Magnetite or hematite or a mixture of both suspended in water. The solids may be ground, for example, to a maximum grain size of 0.1 millimetre and contain 65 to 85 per cent of a grain size less than 0.044 millimetre. The apparent specific gravities attainable with this type of separating medium range from about 1.25 to 2.25.

3. Finely ground galena suspended in water.

4. Finely ground ferro-silicon or cast iron suspended in water. The apparent specific gravity obtainable with this medium is up to about 3.4.

5. Loess or ground shale or ground brick suspended in water. Separating media can be prepared with these materials having specific gravities of up to about 1.6.

6. Mill scale suspended in water. This material may be ground, for example, to a maximum grain size of 0.1 millimetre. The apparent specific gravities obtainable with this medium are up to about 2.5.

7. Iron pyrites suspended in water. The material may be ground, for example, to have a maximum grain size of 0.1 millimetre. Media having apparent specific gravities of up to about 2.2 can be prepared with this material.

8. Finely ground barytes suspended in water. The material may be ground, for example, to a maximum grain size of 0.1 millimetre. Separating media having apparent specific gravities of up to about 2 can be prepared with this material.

The large amounts of clay hitherto employed for the stabilisation of suspensions of barytes, may be dispensed with, in accordance with the present invention. Also the maximum grain size of barytes particles may be increased, and this, apart from the saving on grinding costs, makes possible the use of a greater proportion of barytes to water to produce separating media of higher apparent specific gravities and lower viscosities than hitherto.

With the stabilizing agent in accordance with the present invention, these solids may for practical purposes, be maintained suspended in the separating media without circulation, stirring or other agitation, apart from that unavoidably caused by the addition of the material to be separated and the removal of the separated products. A great saving in power is thus obtained, and also the wear and tear on the apparatus resulting from such circulation or the like is avoided. Moreover a separation plant of simpler design can be employed with a resulting economy in capital outlay.

It is, however, not intended to exclude processes employing circulation or other agitation from the scope of the present invention.

The separating media employed in accordance with the present invention, have the further advantage that their tendency to allow the solids suspended therein to cake is greatly reduced as compared with known suspensions, and is often negligible.

Examples of separating media with the proportions by weight of the ingredients from which they are prepared, their specific gravities and the uses to which they may be put are contained in the following table:

| Suspended solid, Parts per 100 parts of water | Stabilising agent | Sp. Gr. (approx.) | Use |
| --- | --- | --- | --- |
| Barytes, 50 parts | 1 part ferric chloride / 2 parts lime | 1.35 | 1 |
| Sand, 100 parts | 3 parts aluminium sulphate / 2 parts lime | 1.4 | 2 |
| Hematite, 30 parts / Magnetite, 40 parts | 1 part aluminium sulphate / 2 parts lime | 1.5 | 2 |
| Sand, 170 parts | 1 part ferric chloride / 2 parts lime | 1.6 | 2 |
| Magnetite, 120 parts | 1½ parts ferric chloride / 3 parts lime | 1.8 | 2 |
| Ferro-silicon, 310 parts | 3 parts ferric chloride / 6 parts lime | 2.9 | 3 |
| Cast iron, 200 parts / Magnetite, 200 parts | 5 parts ferric sulphate / 10 parts lime | 2.9 | 4 |
| Ferro-silicon, 400 parts | 4 parts ferric chloride / 8 parts lime | 3.2 | 5 |

1. Used for separating coking coal from non-coking coal, shale and pyrites.
2. Used for separating coal from shale and pyrites.
3. Used for separating barren rock from diamondiferous concentrates.
4. Used for separating siliceous gangue materials from iron ore or manganese ore or chrome ore or fluorspar.
5. Used for separating siliceous gangue materials from iron ore or manganese ore or chrome ore.

The specific gravities mentioned are to be taken as indications for convenient practical operations, but higher gravities may be employed, where desired.

Any mixture of solids which: (a) is insoluble in the suspension medium, (b) consists of discrete particles differing substantially in specific gravity, (c) consists substantially of particles, the smallest of which are several times, and preferably ten to fifty times larger than the largest particles of which the suspension is composed, may be separated in accordance with the present invention.

Within a practical range, there is no upper limit to the size of the particles which may be separated.

The invention is of particular advantage in the separation of coal from shale or stone. For this purpose, aqueous suspensions, stabilized in accordance with the present invention, of magnetite, hematite, dolerite, barytes, shale, pyrites, loess, or sand, as the case may be, may be employed as the separating medium, which in this case will be adjusted to a specific gravity of between about 1.2 and 1.8 in most cases, depending on circumstances.

The process is also applicable with great advantage to the separation of ores from gangue or the concentration of ores. As examples of ores which may be thus treated may be mentioned ores of iron, chromium and manganese, copper ores (sulphides or oxidised), tin ores, such as cassiterite, cobalt ores, nickel ores, lead ores, such as galena, zinc ores, such as zinc blend, tungsten ores, such as scheelite or wolframite, molybdenum ores, such as molybdenite, and vanadium ores, such as vanadite. Monazite sands may be concentrated, and other minerals, such as fluorspar, graphite or rock phosphate, may be separated from gangue, concentrated or washed in accordance with the present invention.

Separation in accordance with the present invention is preferably carried out as a continuous operation, heavy separated material being continuously withdrawn at a low level in the separator and light separated material at a high level in the separator. Any process working according to the float and sink process utilising the force of gravity, if necessary augmented or substituted by other forces e. g. centrifugal forces, may be improved by working with suitable suspensions of solids, stabilized in accordance with the present invention.

Apparatus augmenting the separation, such as one or more cyclones, may be employed.

It may also be desirable to set up a pulsating movement in the separating medium to accelerate separation, for example, by providing jigs in the separating bath.

Again a steady upward or downward current may be set up in the medium in order to assist separation.

Preferably, as already indicated, stirring is avoided as far as possible in separation, in accordance with the present invention.

According to a preferred embodiment of the present invention, the separating bath takes the form of an elongated shallow trough filled with separating medium, to which solid material to be separated, e. g., raw coal is introduced at one end. Endless scraper means are provided extending over substantially the entire length of the said trough, the upper length of which scraper skims the surface, and removes solid floating at the surface from the bath. The lower length of the said scraper means, moving in opposite direction, scrapes the base of the trough and thus removes the solid matter, which has sunk, being heavier than the separating medium, to the other end of the trough and out therefrom.

Means for regenerating spent medium and recirculating recovered medium to the separator may be provided, if desired. Thus, for example, if the separating medium becomes unduly enriched in coal dust, the solids in the separating medium may be concentrated and the coal dust separated therefrom, e. g. by flotation or, where suitable, magnetic separation. For the concentration of solids, sedimentation, centrifugal action, or in the case of magnetic materials, magnetic separation may, for example, be resorted to.

The following examples will further illustrate how gravity separation, in accordance with the present invention, may be carried out in practice, but it should be understood that the invention is not limited to the said examples.

*Example*

Figure 1:
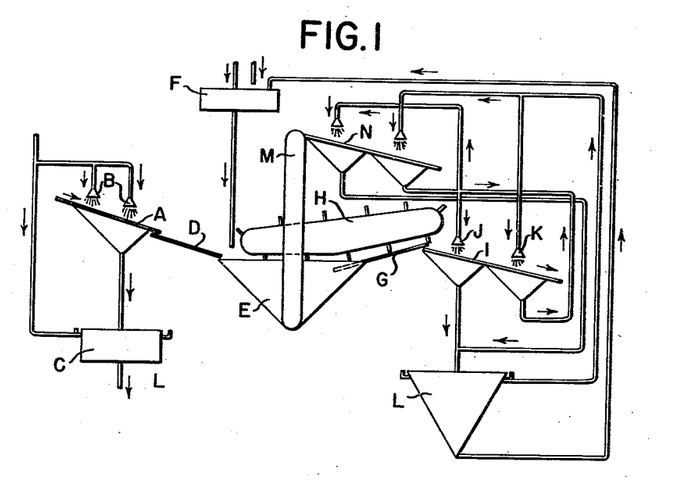

Referring to the drawing, Fig. 1 diagrammatically illustrates a separating plant operating in accordance with the present invention.

With reference to Fig. 1, raw coal, crushed to less than 30 centimetres in size, is fed continuously onto a vibrating screen A having holes of 1.2 centimetres. Water is sprayed over the coal through sprays B, B to free it substantially from dust and to assist in the screening process. The screen undersizes together with the wash water are led either to settling ponds C or they are fed to a trough coal washer or centrifugal coal washer for separate treatment. In either case, the wash water is recovered by sedimentation and fed back together with make up water to the screen sprays. The screened coal is fed continuously by means of a shaking feeder D or other suitable device into the gravity separation tank E, which is a shallow trough of suitable dimensions, having a bottom of conical cross-section. The trough is filled with stabilised separating medium and maintained full from a stock tank F containing the said medium. The medium is maintained at a substantially constant specific gravity in the separation tank, by adjusting the flow from the said stock tank. The clean coal floats on the medium, whereas the shaley coal and impurities which have a higher specific gravity than the medium sink to the bottom of the trough. The coal floating on the medium is moved over the surface of the medium and on to a sloping draining plate G at the end of the trough opposite to the feed by means of a scraper mechanism H, which skims the surface of the medium. On the inclined draining plate G, the coal is partly freed from adherent medium, which flows back into the trough. The same or another scraper conveys the coal from the draining plate on to a washing and dewatering screen I having ¼ inch holes. The coal passing over the screen, is first sprayed with diluted medium from spray J and thereafter with water from spray K to remove adhering medium, and the clean coal delivered by the screen is transported by suitable means to sizing screens and bunkers or to loading appliances.

The stabilised separating medium fed to the trough is prepared by agitating in the stock tank F, 100 parts by weight of water, 93 parts by weight of magnetite crushed to pass a 0.1 mm. screen, 1 part by weight of ferric chloride and 2 parts by weight of slaked lime. The underflow from the washing and dewatering screen I is collected in two portions. The first, which consists of diluted medium is fed to a cone classifier L or a series of cone classifiers, in which the diluted medium is separated into clear water and thickened medium. The thickened medium is pumped to the stock tank F, where its specific gravity is adjusted, when necessary, by the addition of water. The clear overflow is pumped to the spray K at the discharge end of the washing and dewatering screen. The underflow from this portion of the screen consists of dilute medium, and is pumped to the spray J for dilute medium at the feed end of the washing and dewatering screen I. The refuse, which settles to the bottom of the gravity separation tank E, is removed continuously by means of a scraper conveyor M or other suitable means, delivered onto a screen N on which it is freed from adhering medium in a manner similar to that employed for the clean coal, and then conveyed to the refuse dump.

The following analyses on an air-dried basis of raw coal, clean coal and refuse, show the results obtained by this process of coal washing in a medium having a specific gravity of 1.63.

|  | Moisture, Percent | Ash, Percent | Volatile matter, Percent | Calorific value, Cal./gm. |
| --- | --- | --- | --- | --- |
| Raw coal | 2.8 | 18.1 | 29.7 | 6,160 |
| Clean coal, yield 80% | 2.9 | 14.3 | 31.7 | 6,500 |
| Refuse, yield 20% | 2.1 | 33.6 | 22.1 | 4,850 |

With a separating medium similar to the above having a specific gravity of 1.50, the results obtained were:

|  | Ash, Percent | Calorific value, calories/gram |
| --- | --- | --- |
| Raw coal | 26.3 | 5,480 |
| Clean coal, yield 65% | 12.5 | 6,710 |
| Refuse, yield 35% | 52.0 | 3,200 |

*Example 2*

Figure 2:
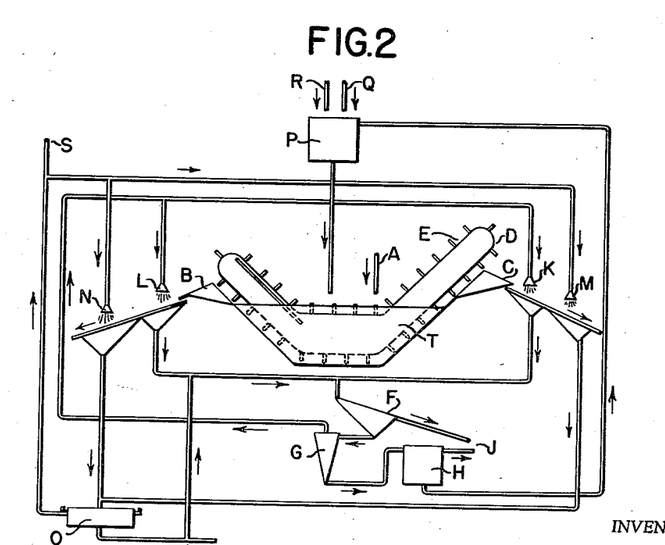

Referring to Fig. 2 of the accompanying drawing, which diagrammatically illustrates another plant for carrying out the process in accordance with the present invention, raw coal, crushed to pass a screen having openings of 20 centimetres diameter and screened over a screen with 1 centimetre openings to remove coal of a size less than 1 centimetre is fed continuously at a point A into the gravity separation tank T, which is a shallow trough of suitable dimensions having vertical side walls and sloping end walls. The trough is filled with the stabilised separating medium and maintained full from the stock tank P containing said medium. The medium in the trough is maintained at a suitable substantially constant level and at a suitable substantially constant specific gravity by adjusting the specific gravity of the medium in the stock tank P. The clean coal floats on the medium and is moved over the surface of the medium in the direction of B, and onto a sloping draining board with the aid of endless transport means, i. e. a scraper mechanism E having vertical flights, whose upper edges project just above the surface of the medium. The coal is scraped up and over the end of the draining board and falls onto a sloping screen B having openings of 6 millimetres. Most of the medium accompanying the coal flows through the screen and back into the trough. The coal slides over b onto a vibrating washing and dewatering screen having 6 millimetre holes. The coal on the screen is sprayed first with dilute medium pumped through the sprays L and then with clear water pumped through the sprays N to remove adhering medium; the clean coal is then discharged from the slaking screen and conveyed by suitable means to bunkers or loading appliances. The impurities in the coal, which have a higher specific gravity than the separating medium, sink to the bottom of the trough and are conveyed by the same scraper mechanism E up the sloping end of the trough in the direction of D and onto the screen C, which is similar to B and then onto a vibrating screen, where it is washed by the sprays K and M in a manner similar to that employed for clean coal, and then conveyed to the refuse dump.

The stabilised medium fed to the trough is prepared by agitating together in the stock tank P, 160 parts by weight of magnetic iron ore crushed to pass a 0.2 mm. screen, 75 parts by weight of water and 2 parts by weight of aluminium sulphate and then adding 4 parts by weight of slaked lime and agitating further. The underflow from spraying screens L and K is conveyed onto the screen F having 0.5 mm. openings. The fine coal retained on this screen is discharged to the refuse dump at J. The screened, dilute medium is pumped to the cyclone G, which discharges an effluent carrying a small proportion of very fine medium and coal dust and a concentrated medium, which passes to a flotation cell H, where it is agitated with a small proportion of paraffin oil and tar-oil to remove the coal dust, which it contains. The froth containing the coal dust is discharged at J and the cleaned medium is pumped to the stock tank P, where its specific gravity is adjusted to that required, by adding water through R or magnetic iron ore through Q, as the case may be. The effluent from the cyclone G is pumped to the sprays K and L. The underflow from the sprays M and N, which consists of much diluted and very fine medium and coal dust, is fed to a settling tank O. The partly settled underflow from O is fed to the screen F and thence to the cyclone; the clear overflow, together with the make up water added at S, is pumped to the sprays M and N. The excessive accumulation of clay and very fine silt in the medium is prevented by continuously or periodically discarding a part of the underflow from the thickener O.

*Example 3*

Mixtures of coal, shaley coal and shale or sandstone and pyrites, such as are obtained in coal mining operations, having particle sizes between, say 30 centimetres and 0.6 centimetre or 0.6 centimetre and 1 millimetre may be separated into (a) clean coal, containing 95% to 98% of the coal and 2% to 5% of the shaley coal and shale and (b) refuse, containing 95% to 98% of the shaley coal, shale and pyrites and 2 to 5% of coal. The separating medium is a stabilised suspension of magnetite or hematite of size 0.06 millimetre to 0 millimetre in water, prepared by adding 1 part of aluminium sulphate dissolved in water and 2 parts of slaked lime per 100 parts of magnetite or hematite to be suspended.

*Example 4*

A mixture of magnetite and hematite iron ore with silica and siliceous gangue (containing 25% of siliceous material) such as is obtained by mining the quartzitic iron ore of the Pretoria district in South Africa is crushed to a size that the smallest particles exceed 4 millimetres and is subjected to a float and sink separation in a medium consisting of an aqueous suspension of ferro-silicon of a maximum particle size 0.1 millimetre. The said suspension was stabilised as described in Example 3, except that iron chloride was employed in place of aluminium sulphate.

*Example 5*

A mixture of chromite, chromitite and siliceous gangue materials, such as may be mixed from the Bushveld chrome deposits, in which the chromitite contains varying amounts of siliceous impurities and of a particle size of 1 millimetre and more can be separated into chromite and high-grade chromitite on the one hand and gangue and low-grade chromitite on the other, by means of an aqueous suspension of ferro-silicon of particle size 0.06 millimetre and less, which has been stabilised as described in Example 2.

For example, an ore containing an average of 43 per cent chromium oxide and 5.5 per cent silica, was separated by means of the said suspension to yield 90 per cent of a clean product, containing 46 per cent of chromium oxide and 10 per cent of discard or waste, containing 16 per cent of chromium oxide and 51 per cent of silica.

The present invention has also brought remarkable improvements in the field of drilling boreholes into the earth, and more particularly in drilling muds used for the said purpose.

More particularly, the invention finds advantageous application in drilling deep bore holes, such as oil and/or gas wells.

The said aqueous suspensions may, inter alia, have one or more of the following functions:

(a) The removal of debris cut out of the bore hole.

(b) The recovery of lost iron parts and tools from the bore hole.

(c) The sealing of the bore hole to prevent the premature escape of oil and/or gas.

(d) Suitably conserving or building up the wall of the bore hole, without detrimentally affecting production, or even with increased production of the hole.

(e) Conserving the drilling bit by lubricating and cooling it.

The drilling muds hitherto employed were not always satisfactory as regards the stability of the suspensions and/or their specific gravities and/or in other respects.

We have found that the properties of drilling media comprising suspensions of comminuted solids in water or other aqueous media are greatly improved by providing a stabilising agent therein as herein specified.

Drilling muds, in accordance with the present invention have the great advantage in drilling operations that, by reason of their great stability, in case of a breakdown of the circulating pumps or in case it is desired to stop them, the solids suspended therein do not settle out to a deleterious extent, and pumping may be resumed even after days without undesired caking occurring in the hole. In fact, substantially only that amount of circulation is required for the removal of debris, iron parts and the like, and no extra pumping to maintain the suspension is usually required. This greatly reduces the wear and tear on equipment, apart from the saving in power obtained with the invention.

The storage properties of drilling muds in accordance with the present invention are also greatly improved, as in view of their stability, and the reduction of their tendency to cake, very little stirring or agitation is required to maintain the suspensions as compared with known drilling muds.

As shown above a wide range of useful specific gravities is presented in suspensions which may be employed as drilling muds in accordance with the present invention, so that stabilised drilling muds of any desired practical specific gravity are made available. Suspensions with a high specific gravity are particularly useful for sealing oil and gas wells and for controlling the pressure therein. Such media are also advantageous for the recovery of lost tools and iron parts from the bore holes. Medium specific gravities will usually suffice for removing debris from the hole.

Also, as hereinbefore shown, the viscosities of drilling muds can, in accordance with the present invention, be adjusted according to the requirements for any specific case. A proper viscosity may, for example, be of importance for the maintenance of the wall of the hole.

The chemical properties of drilling muds, in accordance with the present invention, can be adjusted with particular ease and accuracy in order to provide additional desired properties.

Thus the invention has the advantage in drilling through difficultly controllable formations, such as heaving shales, that various types of alkalinity can be set up in the suspension, depending on the method of production of the stabilising agent, e. g. an excess of lime, magnesia, or sodium hydroxide. Depending on the requirements, the degree of alkalinity can be adjusted with great accuracy. Drilling muds with different alkalinity may be pumped into the well consecutively, or the direction of flow may be reversed from time to time.

When drilling through sodium clay formations it may be of advantage to employ an excess of lime in the stabilised suspension.

Again for some types of heaving shales, it may be of advantage to stabilise the suspension by dissolving in the aqueous medium thereof a salt of a weak acid, say sodium silicate and a salt of the basic oxide, such as calcium chloride, and then adding a reasonable excess of alkali, such as sodium hydroxide. This latter mixture may also be employed, in some cases for maintaining the walls of the holes. For this purpose, it may also be desirable to have sodium silicate present in the medium.

If it is desired to cement the walls of the bore hole, a mud, in accordance with the present invention, which may contain some lime, may be laden with cement.

The invention may be usefully applied also in the mass transportation of comminuted solids, e. g. in ore dressing. For example, a suspension of sand or gold sand or other mineral or solid material in water, stabilised as aforesaid, may be transported by means of gravity flow, or air lift or fluid pumps, under conditions where a similar suspension without the stabilising agent would settle out and clog the pipe-lines or channels and pumps. Besides gold-bearing sands, ground ores may be transported in this way with advantage.

Again a suspension of a grinding agent in water or an aqueous medium, stabilised in the manner hereinbefore described may be more conveniently pumped to the surface to be ground, by reason of the greater stability of the suspension, and the grinding process may be more conveniently controlled, by reason of the greater uniformity of the suspension in accordance with the present invention, compared with like suspensions prepared without stabilising agents of the type herein specified. Examples of such suspensions of grinding agents, are aluminium oxide, corundum, chromium oxide, iron oxide, or Carborundum suspended in water or other aqueous media and stabilised as herein specified. The said suspensions of grinding agents may, for example, be employed in engineering for producing highly polished metal or other surfaces and/or in precision grinding or in metallography.

This application of the invention is further illustrated with reference to the following example, to which the invention is, however, not limited.

*Example 6*

A comparison is made between a suspension of finely divided aluminium oxide in water, without a stabilising agent, used as an abrasive for grinding and polishing, with a like suspension stabilised, in accordance with the present invention.

An unstabilised suspension of 20 parts of aluminium oxide in 100 parts of water settles rapidly, and after a short time the lowermost layers of the suspension contain the coarser particles of abrasive in high concentration, whereas the upper layers of the suspension contain only the finest particles.

A suspension of 20 parts of aluminium oxide in 100 parts of water to which 1 part of aluminium sulphate and 1 part of calcium hydroxide per 100 parts of abrasive have been added in accordance with the present invention, settles out on standing to form an upper layer of clear liquid free from solid suspended particles and a lower layer containing all the abrasive substantially uniformly distributed and not segregated in respect of size. The grinding quality of the lower layer is thus sufficiently uniform throughout for practical purposes, whereas the grinding quality of the partly settled suspension in water alone varies with the depth from the surface.

The flocculent compounds in accordance with the present invention should not be allowed to dry prior to or during their employment as stabilising agents.

In the appended claims the following expressions have the following meanings:

"Reagent of the basic metal oxide type" denotes a basic metal oxide or hydroxide or a water-soluble salt thereof.

"Reagent of the amphoteric oxide type" denotes an amphoteric oxide or hydroxide or a water-soluble salt thereof.

"Reagent of the silicic acid type" denotes silicic acid or a water-soluble salt thereof. The words "stabilised," "stabilising" and "stabile" when used in the specification and the claims in respect of suspensions of solids in aqueous media denotes the inhibition of rapid settling of the suspended solids.

What we claim is:

1. A process for the production of stabilised suspensions of particulate water insoluble solids in aqueous media, which comprises preparing a composite suspension in an aqueous medium of at least one particulate water insoluble solid and of a stabilising agent comprising at least one flocculent metal metallate, which is not more than slightly soluble in the aqueous medium employed, and is produced by interaction of a reagent (a) selected from the group consisting of the oxides, hydroxides and water soluble salts of an alkaline earth metal having an atomic number up to 20 with a reagent (b) selected from the group consisting of the oxides and hydroxides of a trivalent metal having an atomic number between 13 and 26 and the water soluble salts thereof, the said interaction being carried out in an aqueous medium in which a basic reaction is maintained.

2. A process for the production of stabilised suspensions of particulate water insoluble solids in aqueous media, which comprises preparing a composite suspension in an aqueous medium of at least one particulate water insoluble solid and of a stabilising agent comprising at least one flocculent metal metallate, which is not more than slightly soluble in the aqueous medium employed, and is produced by interaction of a reagent (a) selected from the group consisting of the oxides, hydroxides and water soluble salts of an alkaline earth metal having an atomic number up to 20 with a reagent (b) selected from the group consisting of the oxides and hydroxides of a trivalent metal having an atomic number between 13 and 26 and the water soluble salts thereof, the said interaction being carried out in an aqueous medium in which a basic reaction is maintained and the formation of the stabilising agent being accelerated by heating.

3. A process for the production of stabilised suspensions of particulate water insoluble solids in aqueous media, which comprises preparing a composite suspension in an aqueous medium of at least one water insoluble solid and of a small amount of a stabilising agent comprising a flocculent form of calcium aluminate produced by interaction of a reagent (a) selected from the group consisting of an oxide, hydroxide and water soluble salt of calcium with a reagent (b) selected from the group consisting of an oxide, hydroxide and water-soluble salt of aluminium, the said interaction on being carried out in an aqueous medium in which a basic reaction is maintained and the suspended solid having a specific gravity of at least 2.5.

4. A process for the production of stabilised suspensions of particulate water insoluble solids in aqueous media, which comprises preparing a composite suspension in an aqueous medium of at least one particulate water insoluble solid and of a small amount of a stabilising agent comprising a flocculent compound selected from the group consisting of the ferrites and chromites of calcium, produced by interaction of a reagent (a) selected from the group consisting of an oxide, hydroxide and water-soluble salt of calcium with a reagent (b) selected from the group consisting of an oxide, hydroxide and water-soluble salt of trivalent iron and chromium, the said interaction being carried out in an aqueous medium in which a basic reaction is maintained.

5. A process for the gravity separation of materials comprising discrete particles of substantially different specific gravities, which comprises subjecting them to a float and sink process by introducing them into a separating medium of an apparent specific gravity intermediate between those of the components to be separated comprising a suspension of a comminuted solid in an aqueous medium, the stability of which is improved by the presence therein of a stabilising agent comprising a flocculent metal metallate, which is not more than slightly soluble in the medium, and is obtained by interaction in an aqueous medium in which a basic reaction is maintained of a reagent (a) selected from the group consisting of the oxides, hydroxides and soluble salts of an alkaline earth metal having an atomic number up to 20 with a reagent (b) selected from the group consisting of an oxide, hydroxide or water soluble salt of a trivalent metal having an atomic number between 13 and 26 and separately withdrawing separated lighter and heavier material.

6. A process for the gravity separation of materials comprising discrete particles of substantially different specific gravities, which comprises subjecting them to a float and sink treatment with a separating medium of an apparent specific gravity intermediate between those of the components to be separated comprising a suspension of a particulate substantially water insoluble solid having a specific gravity of at least 2.5 in an aqueous medium, the stability of which suspension is improved by the presence therein of a stabilising agent comprising at least one fluocculent metallate which is not more than slightly soluble in the medium, and has been produced by interaction in an aqueous medium, in which a basic reaction is maintained, of a reagent (a) selected from the group consisting of the basic metal oxides, basic metal hydroxides and the water soluble salts thereof with a reagent (b) selected from the group consisting of amphoteric metal oxides, amphoteric metal hydroxides, and the water soluble salts of any of the foregoing.

7. A process for the gravity separation of coal from shaley impurities, which comprises subjecting the coal to be separated to a float and sink treatment in a separating medium having an apparent specific gravity intermediate between those of the coal and the shaley material comprising a suspension of a particulate solid in an aqueous medium, the stability of which suspension is improved by the presence therein of at least one flocculent metal metallate which is not more than slightly soluble in the medium and is obtained by interaction of a reagent (a) selected from the group consisting of the oxides, hydroxides and water soluble salts of an alkaline earth metal having an atomic number up to 20 with a reagent (b) selected from the group consisting of the oxides and hydroxides of a trivalent metal having an atomic number between 13 and 26 and the water soluble salts thereof, the said interaction being carried out in an aqueous medium in which a basic reaction is maintained, and separately withdrawing the coal and the shaley impurities from the separating medium.

8. A process for the production of stabilised suspensions of particulate water insoluble solids in aqueous media, which comprises preparing a composite suspension in an aqueous medium of at least one particulate water insoluble solid and of a stabilising agent comprising at least one flocculent metal metallate, which is not more than slightly soluble in the aqueous medium employed, and is produced by interaction of a reagent (a) selected from the group consisting of an oxide, hydroxide or a water soluble salt of calcium, with a reagent (b) selected from the group consisting of the oxides, hydroxides and water soluble salts of trivalent iron and aluminium, the said interaction being carried out in an aqueous medium in which a basic reaction is maintained, and a greater amount by weight of reagent (a) than reagent (b) being employed.

9. A process for the production of stabilised suspensions of particulate water insoluble solids in aqueous media, which comprises suspending at least one particulate water insoluble substance in an aqueous medium and forming in the suspension thus produced a small amount of stabilising agent comprising at least one flocculent alkaline earth metallate, which is not more than slightly soluble in the aqueous medium employed by causing a water-soluble salt of an alkaline earth metal having an atomic number up to 20 to interact in the said suspension with a reagent selected from the group consisting of water-soluble salts of trivalent iron, chromium and aluminium and an alkali while maintaining a basic reaction.

10. A process for the production of stabilised suspensions of particulate water insoluble solids in aqueous media, which comprises dissolving at least one salt of at least one of the metals iron, chromium and aluminium in the trivalent form in an aqueous medium, suspending a particulate water insoluble solid having a specific gravity between 2.4 and 4 in the solution thus obtained and forming in the suspension thus produced a small amount of stabilising agent comprising at least one flocculent alkaline earth metallate, which is not more than slightly soluble in the aqueous medium employed by causing calcium hydroxide to interact in the said suspension with the said salt while maintaining a basic reaction.

11. A process for the production of stabilised suspensions of particulate water insoluble solids in aqueous media, which comprises suspending 20 to 40 parts by volume of a comminuted water insoluble solid in 100 parts by volume of an aqueous medium and stabilising the suspension by providing therein between 0.5 and 2 per cent (calculated as weight of dry substance to suspension) of a stabilising agent comprising flocculent calcium aluminate prepared by interaction in an aqueous medium in which a basic reaction is maintained, of calcium hydroxide and a soluble aluminium salt.

12. Stable aqueous suspensions of particulate solids, comprising a suspension in an aqueous medium of at least one particulate solid insoluble in water and having a specific gravity of at least 2.4 stabilised with a stabilising agent comprising at least one flocculent metal metallate which is not more than slightly soluble in the aqueous medium selected from the group of flocculent ferrites, chromites and aluminates of calcium and which is produced by interaction of a reagent (a) selected from the oxides, hydroxides and water soluble salts of calcium with a reagent (b) selected from the group consisting of the oxides, hydroxides and water soluble salts, aluminium, trivalent iron and chromium.

13. A process for the gravity separation of materials comprising discrete particles of substantially different specific gravities, which comprises subjecting them to a float and sink process by introducing them into a separating medium of an apparent specific gravity intermediate between those of the components to be separated comprising a suspension of a particulate solid in an aqueous medium and stabilised by a small amount of flocculent calcium aluminate produced by interaction in an aqueous medium in which a basic reaction is maintained of lime and a soluble salt of aluminium, and separately withdrawing the separated constituents of lighter and higher specific gravity from the separating medium.

14. A process for the gravity separation of coal from shaley impurities, which comprises subjecting the coal to be separated to a float and sink treatment in a separating medium having an apparent specific gravity intermediate between those of the coal and the shaley material comprising a suspension of a particulate solid in an aqueous medium, the stability of which suspension is improved by the presence therein of at least one flocculent metal metallate which is not more than slightly soluble in the medium and is obtained by interaction of a reagent (a) selected from the group consisting of the oxides, hydroxides and water soluble salts of an alkaline earth metal having an atomic number up to 20 with reagent (b) selected from the group consisting of the oxides and hydroxides of a trivalent metal having an atomic number between 13 and 26 and the water soluble salts thereof, the said interaction being carried out in an aqueous medium in which a basic reaction is maintained, and the reagents (a) and (b) being employed in proportions between more than 1:1 and 2:1 by weight, and separately withdrawing the coal and the shaley impurities from the separating medium.

15. A process for the gravity separation of materials comprising discrete particles of substantially different specific gravities, which comprises subjecting them to a float and sink process by introducing them into a separating medium of an apparent specific gravity intermediate between those of the components to be separated comprising a suspension of a particulate solid in an aqueous medium and stabilised by a small amount of a flocculent metal metallate selected from the group consisting of the ferrites and chromites of calcium produced by interaction in an aqueous medium in which a basic reaction is maintained of lime and a salt selected from the group of the soluble salts of trivalent iron and chromium, and separately withdrawing the separated constituents of lighter and higher specific gravity from the separating medium.

16. A process for the gravity separation of materials comprising discrete particles of substantially different specific gravities, which comprises subjecting them to a float and sink process by introducing them into a separating medium of an apparent specific gravity intermediate between those of the components to be separated selected from the range between 1.35 and 3.4 and comprising a suspension composed of 15 to 50 parts by volume of a particulate water insoluble solid in 100 parts by volume of an aqueous medium and stabilised by between 0.5 and 1 per cent by weight (calculated as dry substance to suspension) of a stabilising agent comprising at least one flocculent metal metallate which is not more than slightly soluble in the aqueous medium, and has not suffered considerable dehydration since its production, the said stabilised separating medium having been prepared by dissolving at least one salt of a metal selected from the group of aluminium and trivalent iron in an aqueous medium, suspending the particulate water insoluble solid in the solution thus produced and adding lime to the suspension to cause interaction therein for the production of the flocculent stabilising agent while maintaining a basic reaction.

17. A process for the gravity separation of mineral materials comprising discrete particles of substantially different specific gravities which comprises subjecting them to a float and sink process by introducing them into a separating medium of an apparent specific gravity intermediate between those of the components to be separated comprising a suspension of a particulate solid in an aqueous medium stabilised by the presence therein of between 0.5 and 2 per cent (calculated as weight of dry substance to suspension) of a flocculent metal metallate selected from the group of the flocculent aluminates and ferrites of calcium and magnesium and separately withdrawing the separated constituents from the medium.

References Cited in the file of this patent

UNITED STATES PATENTS

| Number | Name | Date |
|---|---|---|
| 760,214 | Klein et al. | May 17, 1904 |
| 1,873,296 | Cross | Aug. 23, 1932 |
| 1,943,532 | Howe | Jan. 16, 1934 |
| 2,026,343 | De Vooys | Dec. 31, 1935 |
| 2,108,290 | Levin et al. | Feb. 15, 1938 |
| 2,108,495 | Levin | Feb. 15, 1938 |
| 2,233,867 | Howe | Mar. 4, 1941 |
| 2,309,931 | Cameron | Feb. 2, 1943 |
| 2,336,595 | Cannon | Dec. 14, 1943 |
| 2,393,160 | Harder et al. | Jan. 15, 1946 |

FOREIGN PATENTS

| Number | Country | Date |
|---|---|---|
| 195,113 | Great Britain | Mar. 29, 1923 |
| 233,842 | Great Britain | May 21, 1925 |
| 507,661 | Great Britain | June 15, 1939 |

OTHER REFERENCES

H. H. Sink and Float Process for Ore Concentration, published for the Huntington, Heberlein and Co., Ltd., received in the Patent Office August 6, 1941, page 5. (Copy in Div. 55.)